United States Patent [19]

Melocik

[11] 4,361,788
[45] Nov. 30, 1982

[54] DUAL-MOTOR DRIVE CIRCUIT WITH HIGH CURRENT SWITCHING

[75] Inventor: Grant C. Melocik, Chardon, Ohio

[73] Assignee: Towmotor Corporation, Mentor, Ohio

[21] Appl. No.: 245,232

[22] PCT Filed: May 7, 1980

[86] PCT No.: PCT/US80/00541
§ 371 Date: May 7, 1980
§ 102(e) Date: May 7, 1980

[87] PCT Pub. No.: WO81/03249
PCT Pub. Date: Nov. 12, 1981

[51] Int. Cl.³ .............................................. H02P 5/46
[52] U.S. Cl. ...................................... 318/83; 318/99; 318/112; 318/341
[58] Field of Search ............... 318/82, 83, 66, 67, 318/99, 98, 100, 112, 65, 55, 345 R, 345 C, 345 B, 345 F, 345 G, 341, 432, 434, 257, 684

[56] References Cited

U.S. PATENT DOCUMENTS

| 3,243,681 | 3/1966 | Dannettell | 318/332 |
| 3,551,773 | 12/1970 | Dannettell | 318/341 |
| 3,575,648 | 4/1971 | Ridding | 318/67 |
| 3,596,154 | 7/1971 | Gurwicz | 318/52 |
| 3,646,414 | 2/1972 | Gurwicz | 318/67 |
| 3,870,935 | 3/1975 | Abels et al. | 318/52 |
| 3,882,365 | 5/1975 | Yemington | 318/269 |
| 4,096,423 | 6/1978 | Bailey et al. | 318/370 |
| 4,110,668 | 8/1978 | Gurwicz et al. | 318/78 |
| 4,126,889 | 11/1978 | Ibamoto et al. | 361/92 |
| 4,168,468 | 9/1979 | Mabuchi et al. | 325/37 |
| 4,207,478 | 6/1980 | Marumoto et al. | 318/341 |
| 4,247,808 | 1/1981 | Hanner | 318/345 |
| 4,275,394 | 6/1981 | Mabuchi et al. | 340/694 |

FOREIGN PATENT DOCUMENTS 1551782 8/1979 United Kingdom ............... 318/112

*Primary Examiner*—B. Dobeck
*Attorney, Agent, or Firm*—Krass & Young

[57] ABSTRACT

An electrically operated dual motor drive system of the type having differentially variable left and right traction motor circuits (10,12) including left and right variable duty cycle power switches (20,22) connecting the motors (14,16) independently to a power source (18), left and right auxiliary switches (28,36) in series with the traction motor circuits for complemental operation of same and a selectively operated shunt switch (64) which connects the power transistors (20,22) in parallel for high torque, low speed operating conditions.

13 Claims, 4 Drawing Figures

DUAL-MOTOR DRIVE CIRCUIT WITH HIGH CURRENT SWITCHING

DESCRIPTION

Technical Field

This invention relates to electrically operated dual motor drive systems for industrial vehicles and the like and particularly to a control circuit for such systems which enhances the operation thereof under high motor current conditions.

Background Art

U.S. Pat. Nos. 3,243,681 and 3,551,773 to Dannettell disclose overload protection systems for electric motors used in vehicles. The 3,243,681 patent discloses a control system for selectively adding a number of power transistors in parallel to accommodate high current conditions in a single traction motor. The 3,551,773 patent discloses an improvement utilizing low value resistors in the power transistor collector legs to assure even current distribution.

U.S. Pat. Nos. 3,596,154 and 3,646,414 to Gurwicz disclose systems for differentially varying the currents to the left and right wheel traction motors in a dual motor vehicle. Gurwicz, like Dannettell, proposes the use of pulse duration modulation (PDM) for varying mean motor current. In both of the Gurwicz systems the left and right traction motors are energized simultaneously but for differentially varying time periods to accommodate vehicle turning conditions as necessary.

It is highly desirable to achieve the differential variable operation mode of Gurwicz in a dual motor system and to provide overload protection for the high torque low speed operating condition which often occurs in the everyday use of industrial vehicles such as forklift trucks. The Dannettell approach is disadvantageous from a cost and complexity standpoint in the requirement for multiple solid state devices as well as control circuitry for paralleling the devices at various current intervals. Another approach, equally disadvantageous, involves the use of individual power switching transistors having sustained peak current ratings which are sufficient to accommodate the peak current which occurs under a low speed, high torque traction motor operating condition. Current transistors having high power ratings are very expensive and this approach can be as costly or more costly than the Gurwicz approach. From a cost point of view the most attractive overload protection system would utilize, to as great an extent as possible, existing dual motor circuit components and avoid the necessity for high current rating transistors. In addition, the system should enhance efficiency to achieve longer intervals between battery re-charges.

Disclosure of the Invention

In one aspect of the invention, inexpensive and highly effective overload protection means are provided for an electrically operated dual motor drive system, preferably of the type having differentially variable left and right traction motor circuits. In general this is achieved through the use of a simple and inexpensive shunt switch for selectively interconnecting the power switches of the differentially variable left and right traction motor circuits in parallel with one another, and control means for operating the shunt switch in response to a high current condition in at least one of the motors. The result is a division of the motor current between two existing power switches under high current conditions such that each power switch need only be rated at about one-half the sustained peak motor current.

In a second aspect of the invention an improvement in the operation of a differentially variable dual motor drive system is achieved through means for establishing complemental; i.e. time staggered, operating periods for the left and right traction motors, the mean current through each individual motor during its respective energization time being variable to control traction motor speed during straight ahead, reverse and turning conditions.

BEST MODE FOR CARRYING OUT THE INVENTION

Figure 1:
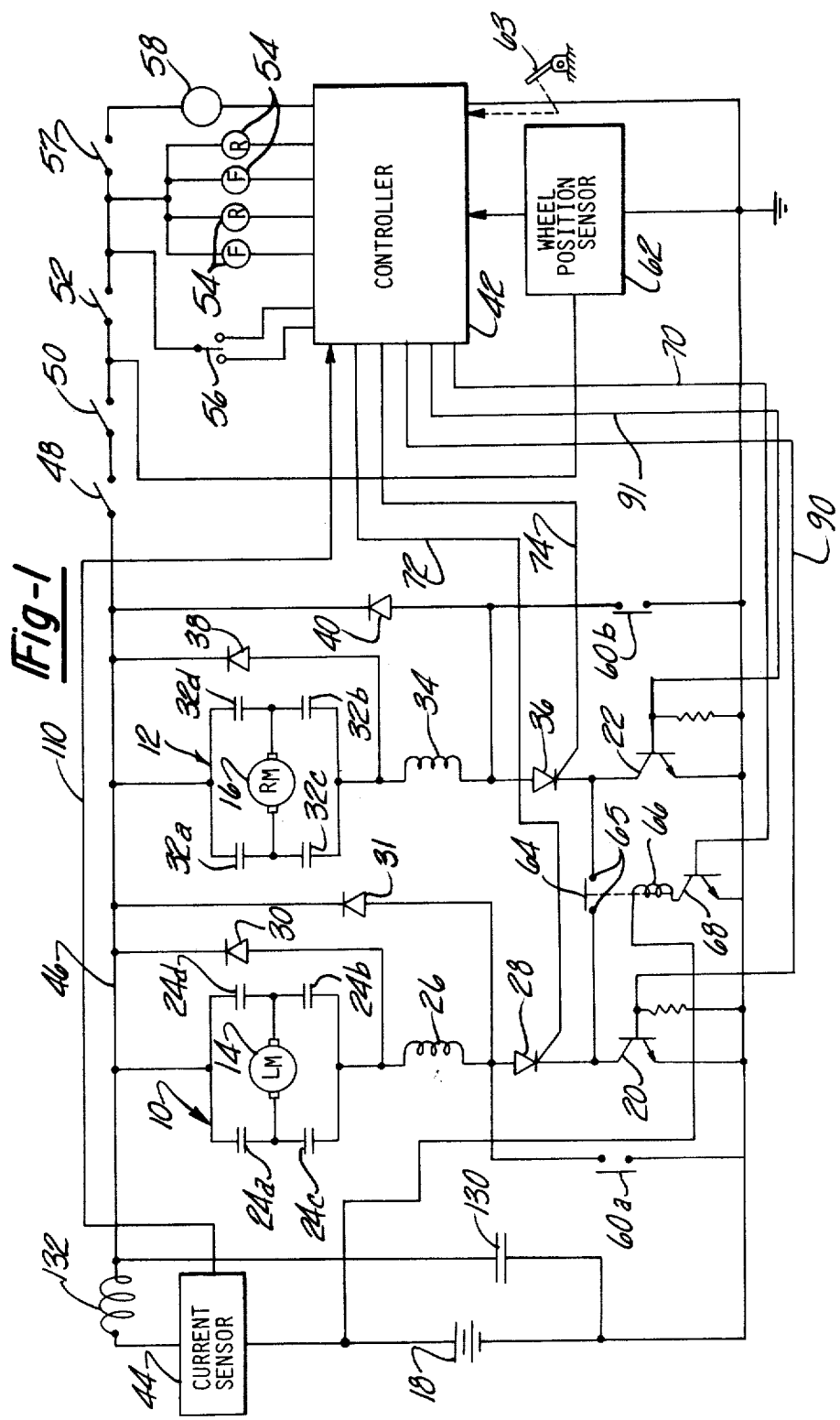
FIG. 1 is a schematic circuit diagram of a dual motor system embodying the invention.

Referring to FIG. 1, an embodiment of the invention in an electrically operated dual motor system is shown to comprise left and right traction motor circuits 10 and 12 respectively, left circuit 10 comprising a reversible electric traction motor 14 and right circuit 12 comprising a reversible electric traction motor 16. Both of the traction motor circuits 10 and 12 receive DC current from a DC power source such as the large heavy duty battery 18. The mean current value through traction motor circuit 10 is controlled by a transistor power switch 20 having a sustained peak current rating which is less than the peak current which can be produced by battery 18 under low speed high torque conditions. Similarly, traction motor circuit 12 is connected in series with power transistor switch 22 which is substantially identical to transistor 20 and has substantially the same current rating. The transistors 20 and 22 are pulse modulated to vary the mean voltage applied to the motor circuits 10 and 12 according to the desired motor speeds.

In practice, transistors 20 and 22 may be pulse frequency or pulse duration modulated in accordance with well-known techniques for controlling traction motor speed. In the present embodiment the mean voltages may be independently or differentially varied according to the various operating conditions of the powered device on which the traction motors 14 and 16 are mounted.

Circuit 10 comprises direction control contacts 24a and 24b which are closed simultaneously to operate the motor 14 in the forward direction and contacts 24c and 24d which are closed simultaneously to operate the motor 14 in the reverse direction. Circuit 10 is connected in series with field winding 26 and auxiliary switching SCR 28, the cathode or output terminal of which is connected directly to the collector electrode of power transistor 20.

Circuit 10 further comprises a plugging diode 30 and a flyback diode 31 to provide a circulating path for current which is generated by the motor 14 when coasting; i.e. when driven by the load or its own inertia.

Circuit 12 comprises direction control contacts 32a and 32b which when simultaneously closed cause current to pass through motor 16 so as to operate it in the forward direction. Circuit 12 comprises further contacts 32c and 32d which when simultaneously closed operate the motor 16 in the reverse direction. Circuit 12 is connected with series field winding 34 and auxiliary switching SCR 36. The output terminal of SCR 36 is connected directly to the collector electrode of power transistor 22.

Circuit 12 further comprises plugging diode 38 and flyback diode 40 which provide recirculating current paths during coasting or load driven conditions.

Both SCR's 28 and 36 comprise primary terminals for load current and a control terminal for controlling conductivity through the primary terminals. The SCR's become conductive upon receipt of a forward biasing trigger pulse and remain conductive until primary current flow ceases.

Contacts 24 and 32 as well as the conductive conditions of switch devices 20, 22, 28 and 36 are controlled by means of a central controller 42 in the form of a condition responsive variable timing sequencer having various outputs hereinafter described. Power source 18 is connected to high voltage line 46 through a shunt-type current sensor 44. Line 46 is connected to the series combination of key switch 48, an operator seat switch 50 and an accelerator switch 52, the latter three elements being utilized in the application of the invention to an electric vehicle as will be further described under the heading "Industrial Applicability". The high voltage line 46 is connected through a series of contact control relay coils 54 and the controller sequencer 42 to establish the conductive or nonconductive (closed or open) condition of contacts 24 and 32 in accordance with the position of the direction control switch 56, a simple relay circuit being sufficient to provide such function. A full-throttle switch 57 connects the battery 18 to a bypass coil 58 which, when energized, closes bypass switches 60a and 60b to connect the lower voltage end of the field windings 26 and 34 directly to ground. Under these conditions, motors 14 and 16 are effectively connected across battery 18 and no modulation occurs. An electromechanical wheel position sensor 62 responds to the position of a dirigible wheel or wheels to differentially vary the pulse duration modulation operating conditions of power transistors 20 and 22 to permit the vehicle to negotiate a turn as is well known in the art.

The circuit thus far described with the exception of the operating modes of transistors 20 and 22 and the presence of auxiliary switching device 28 and 36 is substantially conventional. In accordance with the first aspect of the invention, a switch comprising movable contact 64, solenoid operating coil 66 and transistor switch 68 is connected commonly between the high voltage or collector sides of power switches 20 and 22. When rendered conductive by a signal on line 70 from controller 42, transistor 68 allows current to flow from the battery 18 through the coil 66 to close contacts 65 across the conductive element 64, placing the transistor switches 20 and 22 in parallel. Motor current flowing through traction motor circuit 10 during the on-time of SCR switch 28 is thus shared by the parallel combination of transistor switches 20 and 22. Similarly, motor current flowing through circuit 12 during the on-time of SCR switch 36 is shared by the parallel combination of transistors 20 and 22. The result is a doubling of the sustained peak current capability of the power transistors while permitting the use of relatively inexpensive low power capability transistors for use during normal operation.

In accordance with the second aspect of the invention auxiliary switches 28 and 36 are rendered conductive in complemental or alternately opposite fashion by control signals on lines 72 and 74 from sequencer 42, as hereinafter described. As a consequence, traction motors 14 and 16 are energized alternately, the respective periods of potential energization being equal, and the actual times of energization being modulated by the combination of controller 42, position sensor 62, accelerator 63 and the transistors 20 and 22.

A large head capacitor 130 is connected across the source battery 18 to eliminate harmonic line voltages due to high-speed switching and, hence, improve discharge efficiency. The capacitor 130 is typically located at a point which is physically remote from the battery 18 such that the lead thereto creates a substantial inductance represented in the circuit by element 132.

Figure 2:
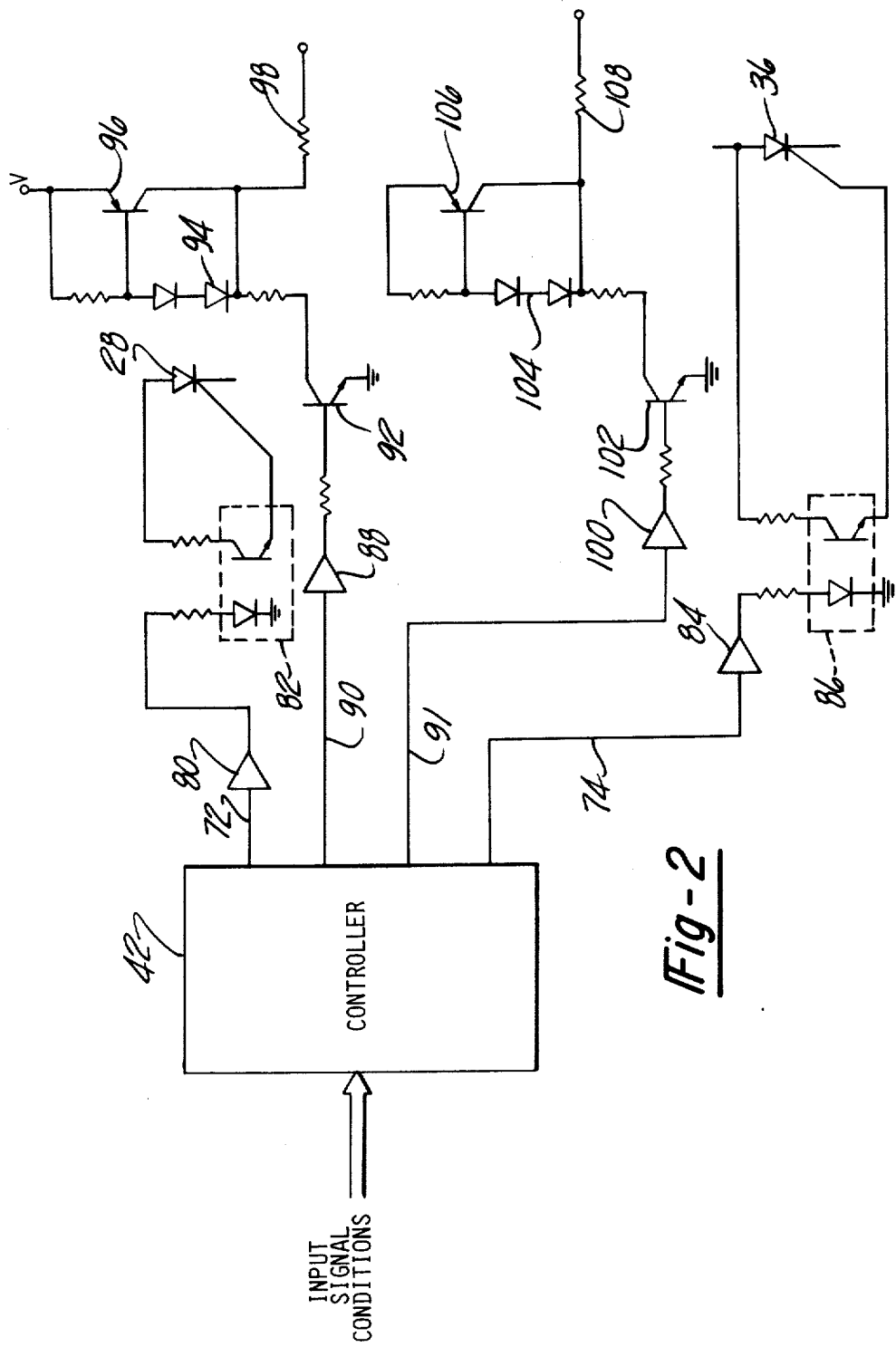
FIG. 2 is a schematic circuit diagram showing the controller from the embodiment of FIG. 1 in greater detail.

FIG. 2 shows four of the circuits which are actuated by sequencer controller 42 in greater schematic detail. Circuit 72 comprises an amplifier 80 and an optical coupler 82, a well known and conventional isolation device connected to the control terminal of SCR switch 28. A trigger pulse from sequencer is operative to render the switch 28 conductive for the first half of a full cycle of dual motor drive operation. Circuit 74 is substantially identical, comprising amplifier 84 and optical coupler 86 for controlling the period of conductivity of SCR switch 36. Circuit 90 for controlling the conductivity of transistor 20 comprises an amplifier 88 and switching transistor 92, the collector of which is connected to high voltage line 46 through the bias network 94 comprising diodes and resistors as indicated in the drawing. When transistor 92 is rendered conductive the decrease in collector potential causes transistor 96 to become conductive causing a forward bias signal to be applied through resistor 98 to power switching transistor 20.

Circuit 91 for controlling the conductivity of transistor 22 is substantially identical to circuit 90 and comprises amplifier 100, transistor 102, bias circuit 104 and the combination of transistor 106 and resistor 108. These specific implementations are merely for purposes of illustration.

Industrial Applicability

Figure 3:
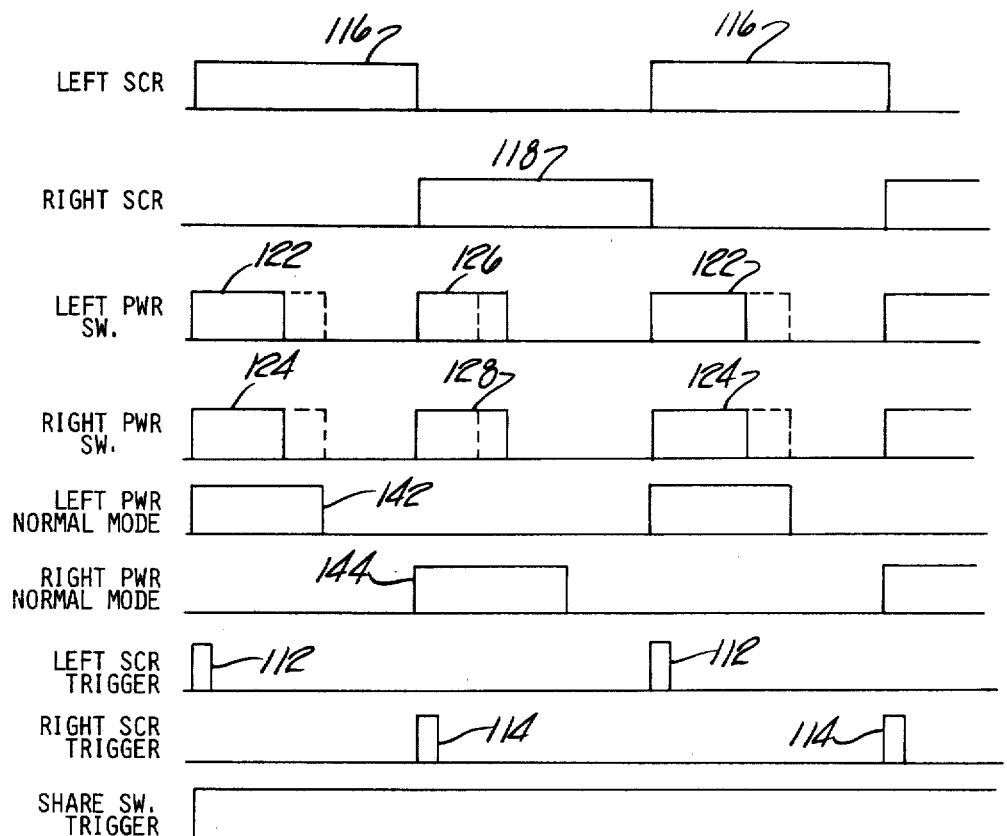
FIG. 3 is a timing diagram for the various signal quantities which are generated in the embodiment of FIGS. 1 and 2.
Figure 4:
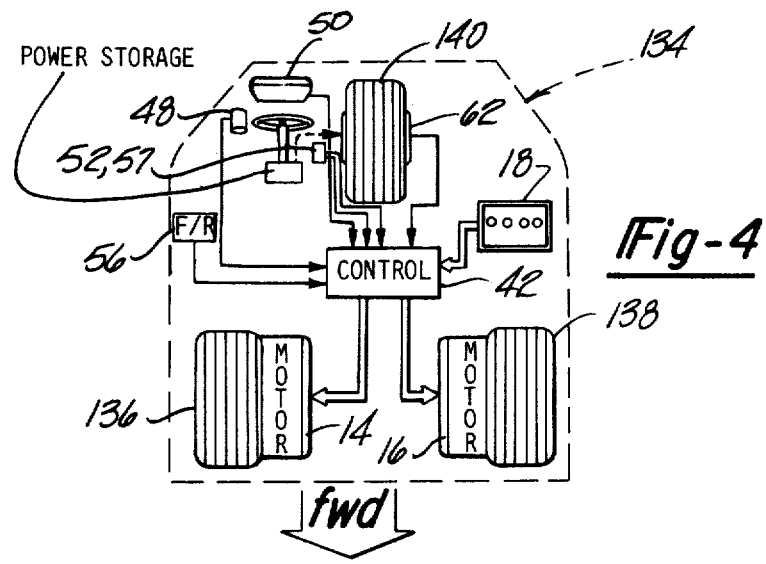
FIG. 4 is a block diagram of an industrial vehicle to which the system of FIG. 1 is applied.

Referring to FIGS. 3 and 4, the operation of the circuits of FIGS. 1 and 2 will now be described with reference to the application of said circuits to an electrically powered three-wheel industrial vehicle 134 such as a forklift truck or tug. In such an application the right traction motor 14 is mechanically connected in driving relation with the right front wheel 136 of the vehicle and the left traction motor 16 is similarly associated with the left wheel 138 of the vehicle. The terms "left" and "right" are taken in the context of the operator who faces in the direction of forward vehicle motion. Wheel position sensor 62 is associated with the rear dirigible wheel 140 of the vehicle and is utilized to differentially vary the mean ON-times of transistors 20 and 22 respectively, thus to vary the mean current flow through the complementally energized traction motor circuits 10 and 12. Forward and reverse direction selection is made by means of switch 56, wheel position sensor 62, control 42 and coils 54 which control the condition of contacts 24 and 32 substantially and as previously described. Key switch 48 is located near the operator station. Accelerator switches 52 and 57 are arranged to be closed at initial and full throttle positions, respectively, to provide inputs to controller 42 along with desired speed from the accelerator. Seat switch 50 is arranged in a known manner to close when an operator assumes a driving position on the seat.

Under normal, middle and high speed operating conditions the circuits of FIGS. 1 and 2 may be operated in a pulse frequency or pulse duration modulation mode to increase and decrease the ON-times of transistors 20 and 22 and thereby control vehicle speed. In such a mode, the transistors are alternately rendered conductive as shown by pulses 142 and 144 of FIG. 3. However, under low speed, high torque and, consequently, high traction motor current conditions, the operation of the circuits of FIGS. 1 and 2 is substantially modified as hereinafter described. The high current condition is sensed by shunt current sensor 44 to provide an enable signal to controller 42 by way of line 110. Controller 42, which may be a properly programmed microprocessor, responds to the high current signal on line 110 to enter a mode wherein the traction motors 14 and 16 continue to be complementally pulsed but with the transistors 20 and 22 pulsed simultaneously. The switch 64 is closed to parallel the power switching transistors 20 and 22 to accommodate the high current situation. The complemental mode of operation is maintained by means of recurring and complemental SCR trigger pulses 112 and 114, pulses 112 being applied to the control terminal of SCR 28 and pulses 114 being applied to the control terminal of SCR 36. As will be well known to persons skilled in the art the pulses 112 and 114 render the associated SCR switches conductive, i.e. forward biased, and the switches will remain in the forwardly conducting condition until current flowing between the input and output terminals thereof is caused to cease. As a result left traction motor SCR 28 exhibits a maximum potential ON-time represented by blocks 116 in the diagram of FIG. 3 whereas the right traction motor SCR 36 is provided with an ON-time potential represented by the blocks 118 in FIG. 3. The trigger signal to transistor 68 which operates the share switch 64 is represented by the constant positive DC signal block 120 in FIG. 3.

Under straight ahead medium throttle (but high torque and high current) conditions power transistors 20 and 22 are simultaneously pulsed on as represented by the solid outlined portions of switching signals 122 and 124 during the ON-time of SCR switch 28 and, as represented by the solid outlined portions of trigger pulses 126 and 128, during the ON-time of the right traction motor SCR switch 36. As will be apparent to the reader, both transistor switches 20 and 22 are simultaneously pulsed on for all high torque low speed operating conditions and are pulse width modulated for applied power control purposes.

The dotted lines associated with the power transistor trigger signals 122, 124, 126 and 128 in FIG. 3 indicate the effect of differential pulse duration modulation wherein the left and right power switch trigger signals 122 and 124 are increased during the ON-time 116 of left traction motor SCR 128 while the trigger signals 126 and 128 are reduced in length during the ON-time 118 of right traction motor SCR 36. Under these conditions the vehicle 134 tends to turn to the right, steering actually being provided by means of the dirigible wheel 140 associated with wheel position sensor 62 whilst the pulse duration modulation scheme described above effects a differential action due to different turning radii of the rear vehicle wheels.

Although the application of the invention has been described with reference to a three-wheeled industrial vehicle having two traction motors and a single dirigible wheel, it is equally applicable to four-wheeled vehicles having two dirigible wheels as well as track laying vehicles having no dirigible wheels. In addition the invention may be applied to other dual motor devices. Similarly, the programmable sequencer 42 may be replaced with equivalent hard-wiring including solenoid operated relays and a potentiometer type speed control for varying the ON-times of transistors 20 and 22. Alternatively, pulse frequency modulation may be effected by means of a throttle controlled variable element in an oscillator tank circuit.

Other aspects, objects and advantages of this invention can be obtained from a study of the drawings, the disclosure and the appended claims.

I claim:

1. An electrically-operated dual-motor drive system of the type having differentially-variable first and second traction motor circuits (10,12) including respective first and second variable duty cycle power switches (20,22) connecting said motor circuits independently to a power source (18) for controlling the operating speeds of the motors in said circuits, the improvement comprising:
a shunt switch (64) interconnecting the power switches (20,22) to establish a parallel connection of said switches when closed; and
control means (42,44,66,68) for closing the shunt switch in response to a high-current condition in at least one of the traction motors.

2. A drive system as defined in claim 1 further including first and second auxiliary switch means (28,36) in series with the first and second traction motor circuits (10,12) respectively, alternately directing power from the source (18) to the first and second traction motors (14,16).

3. A drive system as defined in claim 1 wherein the power switches (20,22) are solid-state transistor-type devices having individual sustained peak current ratings which are less than the actual peak current which is produced by said source (18) under low-speed, high-torque traction motor operating conditions.

4. A drive system as defined in claim 1 including means (24,32,54,56) for reversing the direction of current flow through each of said traction motors (14,16).

5. A drive system as defined in claim 1 wherein the shunt switch (64) is connected between the high-voltage sides of the power switches (20,22) and comprises a set of spaced contacts (65), movable conductor means (64) selectively bridging said contacts, said control means including means (66) for causing movement of said conducting means.

6. A drive system as defined in claim 1 wherein said auxiliary switch means are SCR-type devices (28,36) comprising input and output terminals and a control terminal controlling the conductivity across said input and output terminals, said control means further comprising means (80,82,84,86) connected to said control terminals for alternately applying control signals to the first and second control terminals at a fixed repetition rate.

7. In an electrically operated dual-motor drive system of the type having differentially variable first and second traction motor circuits (10,12) including respective first and second variable duty cycle power switches (20,22) connecting the traction motor circuits to a power source (18) to independently control the operating speeds of the motors (14,16) in said circuits, the improvements comprising:
first and second current control switches (28,36) connected in series with said first and second traction motor circuits (10,12), respectively, and
control means (42,72,74) for alternately operating the first and second current control switches and alternating making power from said source (18) available to the first and second motor circuits.

8. A system of the type described in claim 7 wherein the current control switches are SCR's.

9. A system of the type described in claim 7 further including means (24,32) for selectively reversing the direction of operation of said traction motors.

10. A system of the type described in claim 7 further including switch means (60a,60b) connected in bypass relation with the current control switches (28,36) to connect the traction motor circuits substantially directly across said power source (18).

11. A system as defined in claim 7 including means (42) for effecting pulse duration modulation of the current which alternately flows through said traction motor circuits.

12. In an electrically-operated vehicle 134 having first and second traction motors (4,16) connected to non-dirigible wheels (136,138) and at least one dirigible wheel 140 for direction control, a drive control system comprising:
a battery (18),
first and second power switches (20,22) connecting the first and second traction motors (14,16) in series with the source,
means (42) alternately rendering said power switches (20,22) conductive during a first mode of vehicle operation;
means (42,44) simultaneously rendering said power switches (20,22) conductive during a second mode of vehicle operation; and
switch means (64,65) connecting the power switches in parallel during employment of said second mode of operation.

13. A system as defined in claim 12 which further comprises:
first and second current control switches (28,36) connected in series with said first and second power switches (20,22) respectively; and
means (42) for alternately energizing said first and second current control switches in said second mode of operation.

* * * * *